United States Patent [19]
Tucker et al.

[11] Patent Number: 5,302,290
[45] Date of Patent: Apr. 12, 1994

[54] METHOD FOR REMOVING TOXIC ANIONS FROM WATER

[75] Inventors: Edwin E. Tucker; Sherril D. Christian; John F. Scamehorn, all of Norman, Okla.

[73] Assignee: Board of Regents of the University of Oklahoma, Norman, Okla.

[21] Appl. No.: 24,705

[22] Filed: Mar. 1, 1993

[51] Int. Cl.$^5$ ............................................. B01D 61/16
[52] U.S. Cl. ..................................... 210/638; 210/639; 210/651; 210/913
[58] Field of Search ................. 210/638, 639, 651, 913

[56] References Cited
U.S. PATENT DOCUMENTS 4,089,778  5/1978  Gauger ........................... 210/639 X
5,176,834  1/1993  Christian et al. ................... 210/639

*Primary Examiner*—Frank Spear
*Attorney, Agent, or Firm*—Dunlap, Codding & Lee

[57] ABSTRACT

A method for removing toxic anions from water is provided. A complexing agent, such as a cationic polyelectrolyte, is added to untreated water. The cationic polyelectrolyte complexes with anions, such as chromate, and the complex is filtered out of the water. The complex is then treated with barium chloride, lead chloride, aluminum, iron, or zinc to precipitate chromium ions and to regenerate the complexing agent. The regenerated complexing agent can be reused for water treatment.

24 Claims, 2 Drawing Sheets ns from water.

METHOD FOR REMOVING TOXIC ANIONS FROM WATER

FIELD OF THE INVENTION

The present invention generally relates to methods for purifying water and more specifically to a method for removing toxic anions from water.

DESCRIPTION OF THE PREFERRED EMBODIMENTS

The present invention comprises a method for removing anions, and more particularly toxic anions, from water. Unlike conventional methods for removing toxic anions, such as chromate, from aqueous streams, the present invention does not rely on the addition of quantities of acid and base (large relative to the volume of water to be treated).

Conventional processes for removing chromate, for example, require addition of large quantities of acid and reducing agent and, subsequently, large quantities of base to precipitate hydrous oxides indiscriminately. The treated water thus contains a large quantity of salt. The present invention is selective for anions, works well at pH values which are near 7.0, and requires only about a stoichiometric addition of chemicals to the aqueous stream. Consequently, the ionic concentration of the purified water produced is approximately the same as that of the untreated aqueous stream and, therefore, the potability of the water is not degraded by the process of treatment.

A cationic complexing agent, such as, for example, a cationic polyelectrolyte (also called herein "the polymer"), is added to water containing a target anion. The cationic complexing agent forms a retention complex with a least a portion of the target anions contained in the water. The water is then passed through an appropriately sized filter, such as an ultrafiltration membrane, with a filter pore size small enough to retain the retention complex. The retention complex is thereby retained in a small fraction of the water, called herein "the retentate" or "the retention complex stream", while most of the water (the purified water) is passed with a substantially lower target anion concentration, the purified water known herein as "permeate" or "the purified aqueous stream."

The retentate is then treated with a regeneration agent to separate at least a portion of cationic complexing agent for reuse in the process. The ultrafiltration process may be referred to herein as polyelectrolyte-enhanced ultrafiltration or PEUF. In a preferred embodiment, the cationic complexing agent comprises poly(dimethyldiallylammonium chloride) or PDMDAAC. The ultrafilter preferably comprises a hollow fiber or spiral wound membrane cartridge, such as, for example, the Harp polysulfone membrane hollow fiber cartridge with a 2 sq. ft. area and a 10K molecular weight cutoff.

Figure 1:
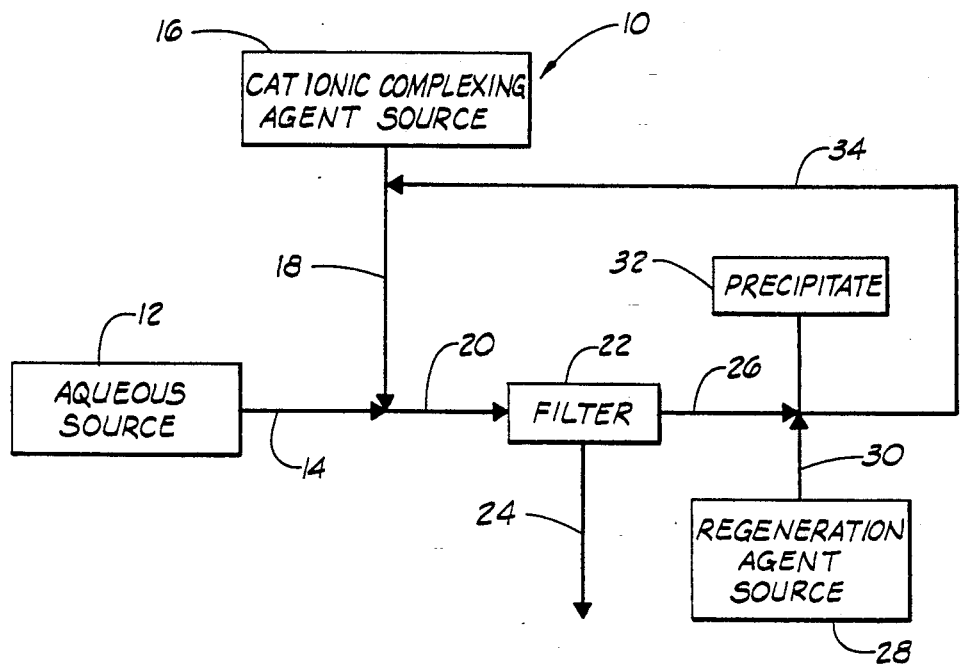
FIG. 1 is a diagrammatic view of the method of the present invention.

The operation of the present invention is shown in FIG. 1, the invention being identified generally by the numeral 10. An aqueous source 12 containing a plurality of toxic anions (for example, chromate) is passed in an aqueous stream 14. A cationic complexing agent (preferably a cationic polyelectrolyte, such as polydimethyldiallylammonium chloride) from a cationic complexing agent source 16 is passed in a first cationic complexing agent stream 18. The cationic complexing agent reacts with at least some of the toxic anions contained in the aqueous stream 14 to form a retention complex in a treated aqueous stream 20.

The treated aqueous stream 20 is passed through a filter 22 (preferably an ultrafilter, such as a Harp polysulfone membrane hollow fiber filter cartridge), passing a permeate or purified aqueous stream 24 which is substantially free of toxic anions, the anions having substantially combined with the cationic complexing agent to form the retention complex, which is retained substantially in the filter 22. The retention complex is flushed from the filter 22 in a retentate or retention complex stream 26, which contains part of the water volume originating in the untreated aqueous stream 14.

A regeneration agent from a regeneration agent source 28 is passed in a regeneration agent stream 30 to mix with the retention complex stream 26. The regeneration agent can consist essentially of barium chloride or lead chloride. The regeneration agent can also consist of metallic iron, zinc, or aluminum, generally in the form of wool, sheets, pellets, chips or powder. For low concentrations of chromate, for example, 0.1 ppm, metallic iron, zinc or aluminum are preferred regeneration agents.

When barium or lead chloride is added to the concentrated polymer/chromate complex (the retention complex) after the step of ultrafiltration, the positively charged barium or lead ions combine with the negatively charged chromate ions to form insoluble precipitates of barium chromate or lead chromate. Additionally, chloride ions from the barium or lead chloride, as well as chloride and other counter ions naturally found in the retentate, combine with the polymer in the polymer/chromate complex to reconstitute the original polymer. A substantial portion of the chromate is separated as a solid material and a substantial portion of the polymer is recycled for further use.

Metallic iron, zinc, or aluminum can also be added to the polymer/chromate complex after the step of ultrafiltration. Metallic iron, zinc and aluminum reduce chromium from the +6 oxidation state to the +3 oxidation state. In the +6 oxidation state, chromium ordinarily is a constituent of the negatively-charged chromate ion, $CrO_4^{2-}$. The applicants believe that by reducing chromium with metallic iron or zinc, the oxidation state of chromium is converted from +6 to +3, whereupon the positively charged chromium ion separates from the positively charged polyelectrolyte. Chromium in the +6 oxidation state is more toxic than chromium in the +3 oxidation state. The +3 chromium ions may remain in solution, but the applicants believe that hydroxide ion is produced by the reaction of iron, zinc or aluminum metal with chromium in the +6 state, and thus chromium in the +3 state (as a constituent of the salt produced) will precipitate naturally. However, to assist precipitation, an amount of base (small relative to the amount of water to be treated) can be added to the regeneration agent stream 26 after the metallic iron, zinc or aluminum has had time to react with the retention complex.

At least a portion of the regeneration agent (if the regeneration agent comprises barium chloride or lead chloride) reacts with the cationic complexing agent contained in the retention complex, resulting in a regenerated cationic complexing agent. A portion of the regeneration agent also reacts with at least a portion of the toxic cations contained in the retention complex, resulting in a precipitate 32.

If the regeneration agent consists of metallic iron, zinc, or aluminum, a base, such as sodium hydroxide, can be added to the retention complex stream 26 in order to assist in forming a precipitate 32. The addition of a base will enhance precipitation in some circumstances, but it is not necessary for the operation of the invention.

When the regeneration agent consists of a metal, the cationic complexing agent picks up appropriate counter ions (such as chloride naturally occurring in the aqueous stream 14), after the chromate is stripped off by reduction, and the cationic complexing agent is thereby regenerated.

The regenerated cationic complexing agent is passed in a second cationic complexing agent stream 34.

Additionally, if the aqueous source 12 contains a high concentration of sulfate ion (a sulfate concentration generally in excess of 100 ppm), the aqueous source 12 may initially be treated by the addition of a precipitating agent, such as barium chloride or lead chloride, as will be explained below. The precipitating agent acts to precipitate at least a portion of the sulfate ion contained in the aqueous source 12. It is understood that the addition of a precipitating agent will enhance the efficiency of anion removal in some circumstances, but is not required for the operation of the present invention.

The second cationic complexing agent stream 34 in a preferred embodiment is combined with the first cationic complexing agent stream 18 for use in treating additional quantities of the aqueous stream 14.

Figure 2:
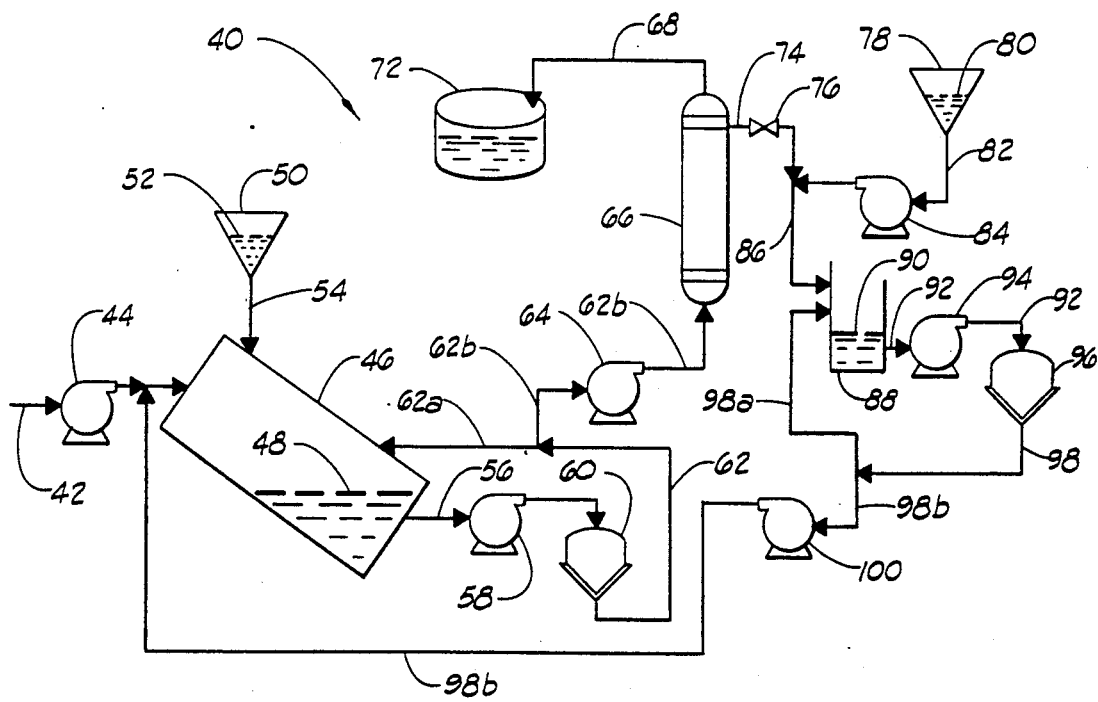
FIG. 2 is a schematic, diagrammatic view of an apparatus constructed to carry out the method of the present invention.

Schematically and diagrammatically shown in FIG. 2, is an apparatus 40 constructed to carry out the method of the present invention. In this embodiment of the invention, barium chloride is used to regenerate PDMDAAC after the PDMDAAC has formed a complex with at least a portion of the chromate.

Ground water containing chromate is fed into the apparatus 40 via a ground water feed 42. The rate of ground water feed is governed by a first metering pump 44. The ground water is fed into a feed reservoir 46, where the ground water is mixed with a polymer 52 fed by gravity into the feed reservoir 46 from a polymer reservoir 50 via a polymer feed 54. Additional polymer can be added to the feed reservoir 46 via a polymer/barium chloride feed 98b, as will be explained below. The polymer 50 reacts with the chromate contained in the feed water, resulting in a polymer treated water 48.

The polymer treated water 48 passes via treated water feed 56 to a first circulation pump 58 and thereafter to a first cartridge filter 60. After leaving the first cartridge filter 60, the treated water feed 56 is divided into a treated water feed 62a and a treated water feed 62b. The treated water in the treated water feed 62a returns to the fee reservoir 46, whereas treated water in treated water feed 62b passes to a DC controlled gear pump 64.

The DC controlled gear pump 64 controls the rate of flow of treated water, via treated water feed 62b, into an ultrafilter 66. The ultrafilter 66 retains a portion of chromate that has combined with the polymer 52, and has formed thereby a retention complex or retentate. Purified water, which is substantially free of chromate, passes via purified water feed 68 to a purified water reservoir 72. The retentate passes via retentate feed 74 to a restriction valve 76, which controls the rate of flow of the retentate.

After passing through the restriction valve 76, the retentate in retentate feed 74 mixes with aqueous barium chloride 80 contained in a barium chloride reservoir 78. The aqueous barium chloride 80 passes via a barium chloride feed 82 through a second metering pump 84, which controls the rate of flow of aqueous barium chloride 80. The second metering pump 84 is connected to the retentate feed 74 by the barium chloride feed 82. The retentate feed 74 and the barium chloride feed 82 combine to form a retentate./barium chloride feed 86 which feeds into a receiving tank 88.

The receiving tank 88 contains a solution of barium chloride, regenerated polymer, and toxic precipitant formed by the reaction of barium chloride with the retentate. The resulting liquid and toxic precipitant 90, via a liquid and particulate feed 92, passes to a third circulation pump 94 and thereafter to a second cartridge filter 96, where the toxic precipitant is removed. The resulting polymer/barium chloride solution passes via polymer/barium chloride feed 98, which splits into a polymer/barium chloride feed 98a and a polymer/barium chloride feed 98b. The polymer/barium chloride feed 98a returns to the receiving tank 88 and the polymer/barium chloride feed 98b goes to a second metering pump 100, which controls the rate of flow of polymer/barium chloride in the polymer/barium chloride feed 98b. The polymer/barium chloride solution is fed from the second metering pump 100 via polymer/barium chloride feed 98b to the ground water feed 42, where polymer/barium chloride solution may be introduced into the ground water feed 42, to provide additional treatment for the ground water.

It will be appreciated that the circulation of liquids through the apparatus 40 is controlled by the first metering pump 44, the DC controlled gear pump 64, the restriction valve 76, the second metering pump 84, and the third metering pump 100. The flow of liquids is controlled to provide the optimum reactive conditions for the polymer, the feed water, the retentate, and the barium chloride.

For example, ground water to be treated can contain, in addition to chromate, a high concentration of sulfate, which interferes with the formation of the chromate/polymer retention complex. Sulfate can be precipitated as barium sulfate by the addition of barium. Therefore, excess aqueous barium chloride 80 (an amount of barium chloride beyond that needed to regenerate the polymer portion of the retention complex contained in the retentate and to form the barium chromate precipitate) from the barium chloride reservoir 78 can be added to the retentate./barium chloride feed 86, resulting in an excess of barium chloride in the receiving tank 88. A portion of the excess barium chloride is introduced into the feed reservoir 46 via polymer/barium chloride feed 98b and ground water feed 42. The barium chloride and at least a portion of the sulfate contained in the ground water of the feed reservoir 46 form a barium sulfate precipitate, which is removed from the polymer treated water by the first cartridge filter 60. It is understood that lead chloride can be used in the apparatus 40 in the same manner as barium chloride.

If metallic iron, zinc, or aluminum is used as the regeneration agent, the reservoir 78, the feed 82 and the second metering pump 84 are not used. For example, metallic iron or zinc (generally in the form of filings) can be added directly to the receiving tank 88. Alternately, a column (not shown), containing metallic iron, zinc, or aluminum (generally in the form of wool, sheets, powder or chips) can be inserted in the feed 86, so that retentate solution is passed through the column.

In a preferred embodiment, a base, such as sodium hydroxide, can subsequently be added to the receiving tank 88, to precipitate chromium +3 ions that have been reduced by the metallic iron, zinc or aluminum, if the reaction of the metal with the chromate does not produce sufficient hydroxide ion to precipitate the chromium and metallic cations formed. The precipitate formed is then filtered out of solution by the second cartridge filter 96.

TABLE I

UF Data for 0.0015M PDMDAAC/0.00005M Chromate

| Feed (M) $CrO_4^{2-}$ | Ret. (M) $CrO_4^{2-}$ | Perm (M) $CrO_4^{2-}$ | Flow gms/ min | Recov. % | Reject % | P in psi |
|---|---|---|---|---|---|---|
| 5.13e-5 | 8.59e-5 | 9.78e-8 | 768.6 | 41.0 | 99.8 | 30.5 |
| 5.08e-5 | 9.84e-5 | 1.09e-7 | 639.9 | 49.2 | 99.8 | 30.1 |
| 4.99e-5 | 1.26e-4 | 1.80e-7 | 499.7 | 61.1 | 99.6 | 30.2 |
| 4.85e-5 | 2.02e-4 | 4.38e-7 | 373.7 | 77.6 | 99.1 | 30.4 |
| 3.66e-5 | 3.95e-4 | 3.60e-6 | 261.3 | 90.4 | 90.2 | 30.5 |
| 2.82e-5 | 4.03e-4 | 4.06e-6 | 285.2 | 95.5 | 85.6 | 35.8 |
| 2.09e-5 | 4.00e-4 | 4.16e-6 | 295.6 | 96.6 | 80.0 | 40.1 |

Feed (M) is the molarity of chromate in the UF feed solution.
Ret (M) is the molarity of chromate in the UF retentate solution.
Perm (M) is the molarity of chromate in the UF permeate solution.
Flow is the total amount of (feed) solution passing through the column per minute.
Recov. % is the per cent of total flow appearing as permeate liquid.
Reject. % is 100 (1-[Perm]/[Feed]) and is the % chromate removed from the permeate.
P (in) is the applied (gage) pumping pressure at the UF column entrance.

Table 1 shows ultrafiltration data for a feed solution at a pH near 7.0 (the untreated aqueous stream) containing 0.0015M polymer (PDMAAC) and 0.00005M chromate. Up to 96% of the feed solution is passed as purified water with a balance (as retentate) containing the retention complex. The quality of the separation becomes substantially poorer as percentage water recovery goes above 90%. At this point, the retentate volume is only 10% of the feed solution volume; in other words, the polymer and chromate have been separated into a retention complex stream only 1/10 the size of the untreated aqueous stream. The only electrolyte change in the water produced is that the original (chloride) counter ion to the polymer has been partially replaced by chromate. The polymer has been used to concentrate the toxic anion into a smaller volume.

Figure 3:
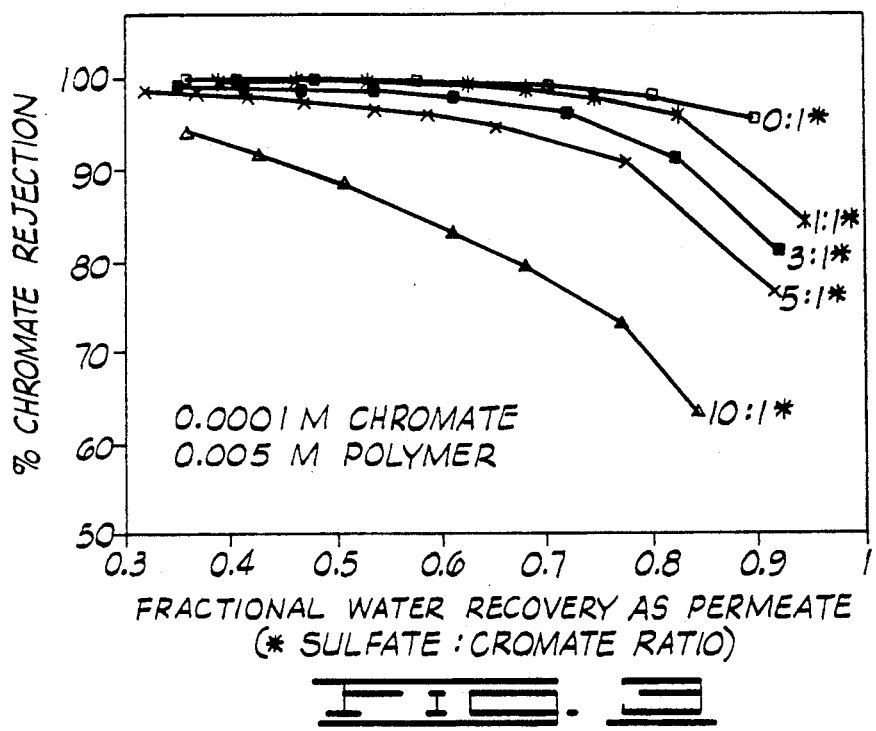
FIG. 3 is a graphic representation of the results of certain experiments relating to chromate rejection versus water recovery for sulfate-chromate mixtures.

FIG. 3 shows results from a series of ultrafiltration experiments at a concentration of 0.005M polymer and 0.0001M chromate with an increasing background concentration of sulfate. At sulfate:chromate ratios no larger than 5:1, the chromate rejection is as high as 95% with a water recovery of 0.8. However, large excesses of sulfate have a detrimental effect on the ultrafiltration process and therefore sulfate concentration should be reduced for efficient performance, such as can be accomplished by pre-treating the feed solution with barium chloride in order to precipitate at least part of the sulfate out of the feed solution.

At one site, ground water contained an inorganic solids concentration of approximately 500 ppm. The inorganic solids consisted essentially of sodium, calcium, and magnesium (cations) and chloride and sulfate (anions). The sulfate concentration ranged from 80–100 ppm. The chromate concentration ranged from 0.1 ppm – 7 ppm in samples from several monitoring wells. Table 2 (below) shows PEUF data for one sample with a chromate level of approximately 7 ppm and a sulfate level of 88 ppm.

TABLE II

UF Data for Ground Water (7 ppm Chromate; 88 ppm sulfate)

| Feed (M) $CrO_4^{2-}$ | Ret. (M) $CrO_4^{2-}$ | Perm (M) $CrO_4^{2-}$ | Flow gms/ min | Recov. % | Reject % | P in psi |
|---|---|---|---|---|---|---|
| 1.27e-4 | 2.00e-4 | 7.69e-6 | 633.6 | 38.2 | 93.9 | 30.9 |
| 1.24e-4 | 2.57e-4 | 1.03e-5 | 383.8 | 54.4 | 91.7 | 31.4 |
| 1.21e-4 | 3.77e-4 | 1.27e-5 | 238.6 | 70.3 | 89.4 | 30.4 |
| 1.09e-4 | 6.58e-4 | 1.95e-5 | 145.2 | 87.4 | 82.2 | 30.9 |
| 1.15e-4 | 5.33e-4 | 1.80e-5 | 186.7 | 82.3 | 84.3 | 35.5 |
| 1.09e-4 | 6.42e-4 | 2.09e-5 | 179.5 | 86.5 | 80.8 | 41.2 |

The ground water sample (with a pH of approximately 6.5) was not pre-treated in any way. A small volume of polymer was added and the solution was run through the apparatus 40 as explained above. Three separate experiments with polymer concentrations of 0.005, 0.01 and 0.025M, respectively, were performed with a sample of the ground water; however the data in Table 2 are for the 0.01M added polymer concentration. As shown, chromate rejection is above 80% at all water recovery values for this particular water sample, the water sample containing a substantial level of electrolytes.

TABLE III

UF Data for Ground Water (ca. 0.2 ppm chromate-sulfate reduced)

| Feed (M) $[CrO_4^{2-}]$ | Ret. (M) $[CrO_4^{2-}]$ | Perm (M) $[CrO_4^{2-}]$ | Flow g/min | Recov. % | Reject % | Input P psi |
|---|---|---|---|---|---|---|
| 4.31e-6 | 8.51e-6 | 5.00e-7 | 514.2 | 52.5 | 88.4 | 36.2 |
| 4.32e-6 | 9.03e-6 | 5.32e-7 | 476.6 | 55.2 | 87.7 | 36.3 |
| 4.30e-6 | 9.83e-6 | 5.30e-7 | 423.8 | 59.2 | 87.7 | 36.1 |
| 4.28e-6 | 1.08e-5 | 5.88e-7 | 369.8 | 63.6 | 86.3 | 36.2 |
| 4.24e-6 | 1.20e-5 | 6.38e-7 | 321.4 | 68.7 | 85.0 | 36.3 |
| 4.13e-6 | 1.71e-5 | 8.00e-7 | 238.2 | 80.0 | 80.6 | 36.9 |

Another ground water sample was tested in which the sulfate:chromate ratio was unfavorable at 90 ppm sulphate to 0.2 ppm chromate. The test results are shown in Table 3, above. The ratio of sulfate to chromate was 450:1 in this sample and therefore the sample was treated with a small quantity of barium chloride to precipitate a quantity of the sulfate before doing the UF experiment. As shown in Table 3, chromate was removed to less than 42 ppb (0.0000008M).

Figure 4:
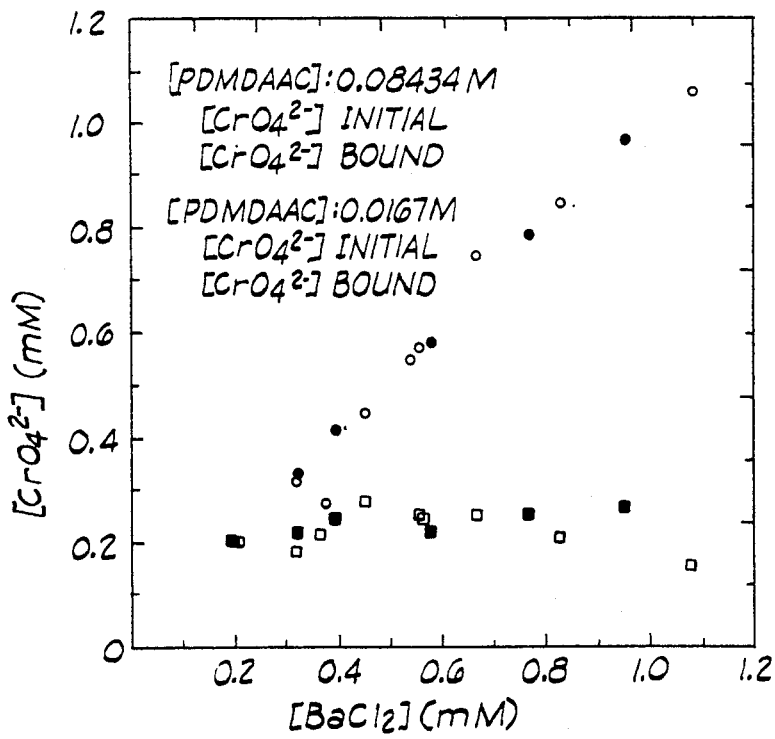
FIG. 4 is a graphic representation of the results of certain experiments relating to chromate precipitation by barium chloride in the pressure of poly dimethyldiallylammonium chloride.

The separation of polymer from chromate contained in the retention complex was also tested. One set of experiments, as shown in FIG. 4, consisted of equilibrating various mixtures of polyelectrolyte, sodium-chromate and barium chloride. The polyelectrolyte concentration in nine separate experiments varied from 0.001M to 0.12M. At each specific polyelectrolyte concentration, approximately equimolar concentrations of barium chloride and sodium chromate were added up to a maximum of approximately 0.001M.

The upper points in FIG. 4 represent the total amount of chromate present in the test solutions. After equilibration, the test solutions were filtered to remove precipitate and then the permeate was analyzed for residual chromate. The graph shows two particular data sets of this type for PDMDAAC concentrations of 0.0167M and 0.0843M. The conversions of the lines indicate the point at which little barium chromate will be precipitated in the polyelectrolyte-barium chloride-sodium chromate mixture.

The lower set of points show the residual chromate concentration in the solution. The vertical difference between the two lines in FIG. 4 is the measure of the amount of chromate precipitated as the barium salt ($BaCrO_4$). Much of the chromate in the polymer solution can be precipitated as barium chromate; however, a significant amount of chromate remains in the solution due to the strong interaction of chromate with the cationic PDMDAAC.

In this experiment, no more than a stoichiometric amount of barium chloride was used to precipitate sodium chromate. Excess barium chloride can be used to remove more chromate. Excess barium ion resulting from this process can be naturally removed by making use of the fact that natural waters will, in general, have an appreciable level of sulfate (as did the ground water samples tested above). This sulfate will have the effect of taking up excess barium ion, therefore, in many cases, excess barium chloride can be added to the retentate to precipitate chromate. When the polymer from the retentate is recycled (carrying the excess barium) to mix with the incoming feed stream (high in sulfate) two objectives will be accomplished: both barium and sulfate will be removed from the feed source. This has the effect of improving the UF process in two ways (1) excess sulfate is removed from the feed stream, and (2) excess barium (which aids in improved chromate precipitation and retentate) is removed before it can appear in the permeate water. Changes may be made in the steps or in the sequence of steps of the methods described herein without departing from the spirit and scope of the invention as defined in the following claims.

What is claimed is:

1. A method for removing toxic anions from water, comprising the steps of:
   providing an untreated aqueous source comprising a quantity of a toxic anion;
   providing a cationic complexing agent;
   providing a regeneration agent;
   passing an untreated aqueous stream;
   passing the cationic complexing agent in a first cationic complexing agent stream;
   passing the regeneration agent in a regeneration agent stream;
   mixing the untreated aqueous stream and the first cationic complexing agent stream, the cationic complexing agent contained therein forming a retention complex with at least a portion of the toxic anion contained in the aqueous stream;
   passing the retention complex in a treated aqueous stream;
   filtering the treated aqueous stream, thereby forming a purified aqueous stream and a retention complex stream;
   passing the purified aqueous stream;
   passing the retention complex stream;
   mixing the regeneration agent stream with the retention complex stream, at least a portion of the regeneration agent and retention complex contained respectively therein acting to release at least a portion of the cationic complexing agent in a second cationic complexing agent stream; and
   passing the second cationic complexing agent stream.

2. The method of claim 1 further comprising the step of: combining the second cationic complexing agent stream with the first cationic complexing agent stream.

3. The method of claim 1 wherein the step of filtering the treated aqueous stream further comprises passing the treated aqueous stream through an ultrafilter.

4. The method of claim 1 wherein the toxic anion further consists essentially of an anionic chromium compound.

5. The method of claim 4 wherein the anionic chromium compound further consists essentially of chromate.

6. The method of claim 4 wherein the regeneration agent is selected from a group consisting essentially of barium chloride and lead chloride.

7. The method of claim 6 wherein the regeneration agent contained in the regeneration agent stream further acts with a portion of the retention complex contained in the retention complex stream to form a precipitate.

8. The method of claim 4 wherein the regeneration agent is selected from a group consisting essentially of metallic iron, metallic zinc, and metallic aluminum.

9. The method of claim 8 wherein the step of mixing the regeneration agent stream and the retention complex stream further comprises mixing a base therein, the base acting with a portion of the retention complex to form a precipitate.

10. The method of claim 1 wherein the cationic complexing agent further consists essentially of a cationic polyelectrolyte.

11. The method of claim 10 wherein the cationic polyelectrolyte further consists essentially of polydimethyldiallylammonium chloride.

12. A method for removing toxic anions from water, comprising the steps of:
   providing an untreated aqueous source comprising a quantity of a toxic anion and a quantity of sulfate;
   providing a cationic complexing agent;
   providing a regeneration agent;
   passing an untreated aqueous stream;
   passing the cationic complexing agent in a first cationic complexing agent stream;
   mixing the untreated aqueous stream and the first cationic complexing agent stream, the cationic complexing agent contained therein forming a retention complex with at least a portion of the toxic anion contained in the aqueous stream;
   passing the retention complex in a treated aqueous stream;
   filtering the treated aqueous stream, thereby forming a purified aqueous stream and a retention complex stream;
   passing the purified aqueous stream;
   passing the retention complex stream;
   mixing the regeneration agent with the retention complex stream, the regeneration agent and the retention complex acting to release at least a portion of the cationic complexing agent in a second cationic complexing agent stream; and
   passing the second cationic complexing agent stream.

13. The method of claim 12 further comprising the step of: combining the second cationic complexing agent stream with the first cationic complexing agent stream.

14. The method of claim 12 wherein the toxic anion consists essentially of an anionic chromium compound.

15. The method of claim 14 wherein the anionic chromium compound further consists essentially of chromate.

16. The method of claim 14 wherein the regeneration agent is from a group consisting essentially of barium chloride and lead chloride.

17. The method of claim 16 wherein the regeneration agent contained in the regeneration agent stream further acts with a portion of the retention complex contained in the retention complex stream to form a precipitate.

18. The method of claim 14 wherein the regeneration agent is selected from a group consisting essentially of metallic iron metallic zinc, and metallic aluminum.

19. The method of claim 18 wherein the step of mixing the regeneration agent stream with the retention complex stream further comprises mixing a base therein, the base acting with at least a portion of the retention complex to form a precipitate.

20. The method of claim 18 wherein the step of mixing the regeneration agent stream with the retention complex stream further comprises passing the retention complex stream through a column containing the regeneration agent.

21. The method of claim 12 wherein the step of filtering the treated aqueous stream further comprises passing the treated aqueous stream through an ultrafilter.

22. The method of claim 12 wherein the cationic complexing agent further consists essentially of a cationic polyelectrolyte.

23. The method of claim 22 wherein the cationic polyelectrolyte further consists essentially of polydimethyldiallylammonium chloride.

24. The method of claim 12 further comprising the step of mixing a substance selected from a group consisting of barium chloride and lead chloride with the untreated aqueous stream, the substance acting with at least a portion of the sulfite contained in the untreated aqueous stream to form a precipitate.

* * * * *

UNITED STATES PATENT AND TRADEMARK OFFICE
CERTIFICATE OF CORRECTION

PATENT NO. : 5,302,290
DATED : April 12, 1994
INVENTOR(S) : Tucker et al.

It is certified that error appears in the above-identified patent and that said Letters Patent is hereby corrected as shown below:

```
Column 4, line 36, please delete "second", and
substitute therefore --third--.

Column 4, line 40, please delete "second", and
substitutet therefore --third--.
```

Signed and Sealed this

Twenty-third Day of August, 1994

Attest:

BRUCE LEHMAN

Attesting Officer          Commissioner of Patents and Trademarks